United States Patent
Hua et al.

(10) Patent No.: US 7,106,702 B2
(45) Date of Patent: Sep. 12, 2006

(54) ON-DEMAND DYNAMICALLY UPDATED USER DATABASE AND AAA FUNCTION FOR HIGH RELIABILITY NETWORKS

(75) Inventors: Shiyan Hua, Wheaton, IL (US); Ahmed N. Zaki, Lisle, IL (US)

(73) Assignee: Lucent Technologies Inc., Murray Hill, NJ (US)

(*) Notice: Subject to any disclaimer, the term of this patent is extended or adjusted under 35 U.S.C. 154(b) by 1008 days.

(21) Appl. No.: 10/158,815

(22) Filed: May 31, 2002

(65) Prior Publication Data
US 2003/0223386 A1    Dec. 4, 2003

(51) Int. Cl.
*H04L 12/28* (2006.01)
(52) U.S. Cl. .......... 370/255; 455/415; 370/328
(58) Field of Classification Search .......... 370/255, 370/328; 455/415, 433; 714/4; 713/200; 707/200; 709/208
See application file for complete search history.

(56) References Cited

U.S. PATENT DOCUMENTS

| | | | |
|---|---|---|---|
| 5,812,751 A | * | 9/1998 | Ekrot et al. .......... 714/4 |
| 6,914,887 B1 | * | 7/2005 | Idsinga .......... 370/255 |
| 2002/0184239 A1 | * | 12/2002 | Mosher et al. .......... 707/200 |
| 2003/0005350 A1 | * | 1/2003 | Koning et al. .......... 714/4 |
| 2003/0032414 A1 | * | 2/2003 | Melaku et al. .......... 455/415 |
| 2003/0112977 A1 | * | 6/2003 | Ray et al. .......... 380/270 |
| 2003/0149735 A1 | * | 8/2003 | Stark et al. .......... 709/208 |
| 2004/0098612 A1 | * | 5/2004 | Lee et al. .......... 713/200 |

* cited by examiner

*Primary Examiner*—Hassan Kizou
*Assistant Examiner*—Albert T. Chou

(57) ABSTRACT

A method is provided for operating a wireless communication network (10) including a plurality of nodes (12a, 12b, 12c, 12d, 12e). Each of the nodes has a user database and is equipped to conduct authentication, authorization and accounting (AAA) functions for the network (10). The method includes employing a subset (optionally, two) of the plurality of nodes (12a, 12b, 12c, 12d, 12e) as active nodes. The active nodes use their respective user databases to conduct the AAA functions for the network (10). Changes to the user databases for the active nodes are logged to thereby update the same to reflect changes in information contained therein, and the user databases of the active nodes are synchronized. The active nodes are monitored to detect if one becomes disconnected from the network, and, if one of the active nodes becomes disconnected from the network, another of the plurality of nodes (12a, 12b, 12c, 12d, 12e) is employed as an active node.

20 Claims, 2 Drawing Sheets

# ON-DEMAND DYNAMICALLY UPDATED USER DATABASE AND AAA FUNCTION FOR HIGH RELIABILITY NETWORKS

FIELD OF THE INVENTION

The present invention relates to the art of wireless communications and/or networks. It find particular application in conjunction with military communication networks will be described with particular reference thereto. However, it is to be appreciated that the present invention is also amenable to other like applications where high reliability networks are desirable.

BACKGROUND OF THE INVENTION

To carry out the Authentication, Authorization and Accounting (AAA) functions of a wireless communications network, a user database is typically employed. The user database is updated as the user information (e.g., identification, permission, location, AAA information, etc.) maintained therein changes.

In high reliability networks it is desirable to have redundancy in functionality and/or resources so that one or more back-ups may take over when functions and/or resources are lost due to failure or otherwise. For example, in a military wireless communications network, the nodes of the network may be targeted and destroyed by an enemy, or the adverse conditions of the theater of operations may otherwise cause one or more of the nodes to become unavailable to or disconnected from the network. Should a node be the only one capable of AAA functionality and/or be the sole location for maintenance of the user database, the destruction of that node or its separation from the network would undesirably disrupt the entire network. Therefore, particularly in military applications, the threat of a focused attack on and/or the higher potential for destruction of network nodes (as compared to civilian networks) makes redundancy in AAA functionality and/or the user database a real advantage.

One approach for achieving the desired redundancy is to have every node in the network carry out AAA functions and distribute a duplicate copy of the user database to every node for maintenance thereon. In this manner, the destruction or lost of any one node is not fatal to the network as a whole. In an implementation of the aforementioned approach, however, when a change in one user database is introduced at a given node, it is broadcast to all the others to keep the duplicate copies of the user database synchronized with one another. This database synchronization traffic can be considerably large and undesirably burdensome on the network.

The present invention contemplates a new and improved method and/or system which overcomes the above-referenced problems and others.

SUMMARY OF THE INVENTION

In accordance with an aspect of the present invention, a method of maintaining authentication, authorization and accounting (AAA) functionality is provided for a wireless communications network having a plurality of nodes which are AAA function capable. The method includes selecting two of the plurality of nodes to be active nodes, and activating the AAA functions of the active nodes. The active nodes are monitored to determine if one gets disconnected from the network. If one of the active nodes gets disconnected from the network, another of the plurality of nodes is selected to become an active node, and its AAA functions are activated. The plurality of nodes are then informed that the node selected has its AAA functions activated.

In accordance with another aspect of the present invention, a wireless communication network includes a plurality of nodes, each node being initially provisioned with a user database and equipped to carry out authentication, authorization and accounting (AAA) functions for the network by employing their respective user database. The plurality of nodes includes a subset thereof which are active nodes that in fact carry out the AAA functions for the network by employing their respective user databases. The active nodes monitor one another to detect if an active node becomes disconnected from the network. When one is determined to be disconnected from the network another of the plurality of nodes is selected to be an active node and the network informed thereof.

In accordance with yet another aspect of the present invention, a method is provided for operating a wireless communication network including a plurality of nodes, each of said nodes having a user database and being equipped to conduct authentication, authorization and accounting (AAA) functions for the network. The method includes: employing a subset of the plurality of nodes as active nodes, the active nodes using their respective user databases to conduct the AAA functions for the network; logging changes to the user databases for the active nodes thereby updating the same to reflect changes in information contained therein; synchronizing the user databases of the active nodes; monitoring the active nodes to detect if one becomes disconnected from the network; and, if one of the active nodes becomes disconnected from the network, employing another of the plurality of nodes as an active node.

One advantage of the present invention is the ability to provide a high reliability wireless communications network with low user database synchronization traffic.

Another advantage of the present invention is the ability to guard against network interruptions by selectively choosing nodes to conduct AAA functions for the network based upon their relative geographic location.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention. Further, it is be appreciated that the drawings are not to scale.

DETAILED DESCRIPTION OF THE INVENTION

Figure 1:
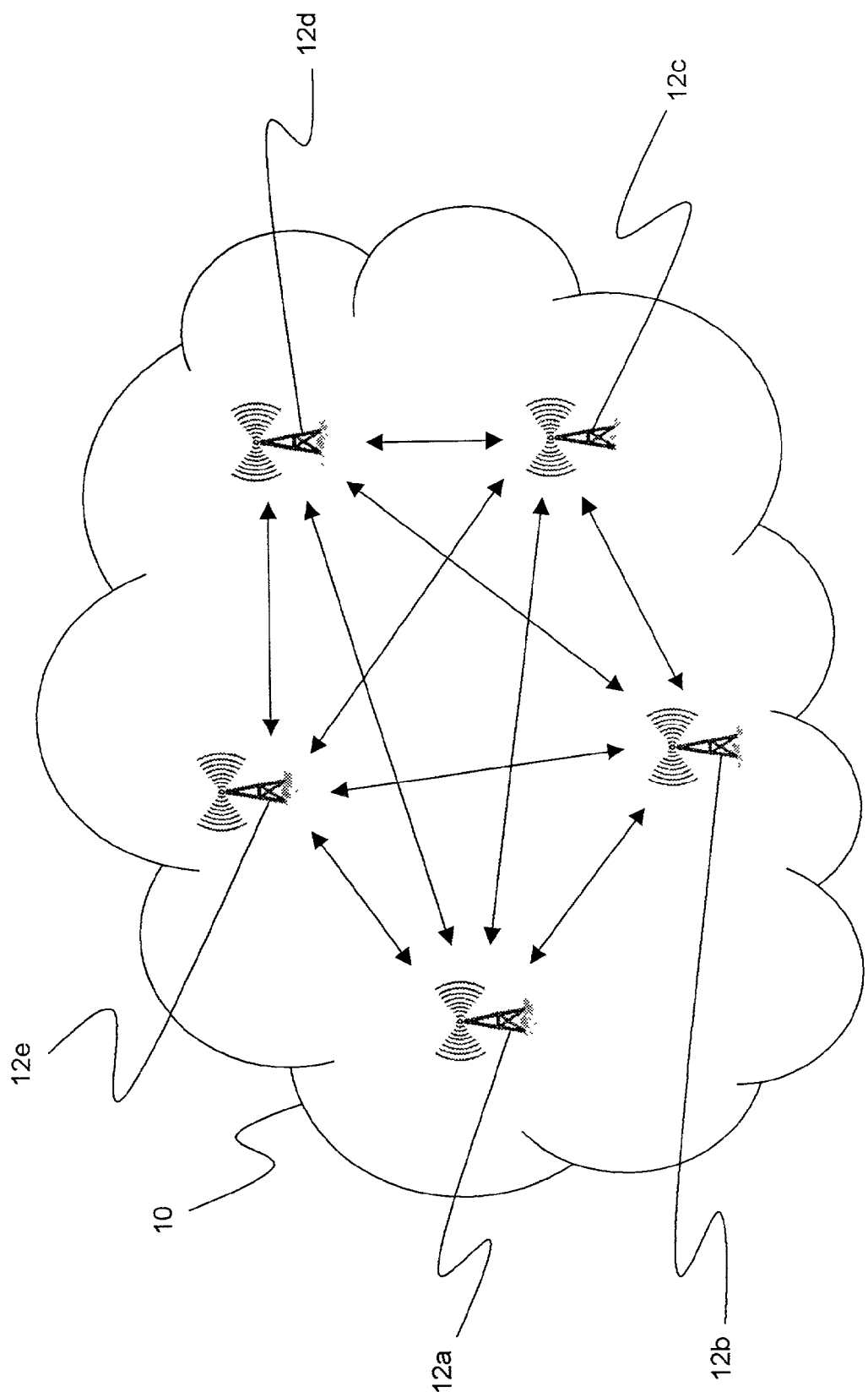
FIG. 1 is diagrammatic illustration showing a wireless communications network in accordance with aspects of the present invention.

With reference to FIG. 1, a wireless communications network 10 is comprised of a plurality of nodes. For exemplary purposes, FIG. 1 shows five such nodes, namely, 12*a*, 12*b*, 12*c*, 12*d* and 12*e*. It is to be appreciated, however, that the network 10 may contain more or less nodes as desired.

Preferably, each node in the network 10 can communicate directly with all the other nodes in the network 10. Each of the nodes preferably is and/or supports a mobile switching center (MSC), visitor location register (VLR), home location register (HLR), and cell site. The MSC, VLR, HLR and cell site integrated in each node may be of any appropriate kind known in the art. Each node is also capable of acting as the AAA functional entity for the network, e.g., by including and/or supporting a AAA server, and is capable of maintaining a user database associated with the AAA functions. Note, a traditional VLR may be combined with a AAA server and become part thereof.

Figure 2:
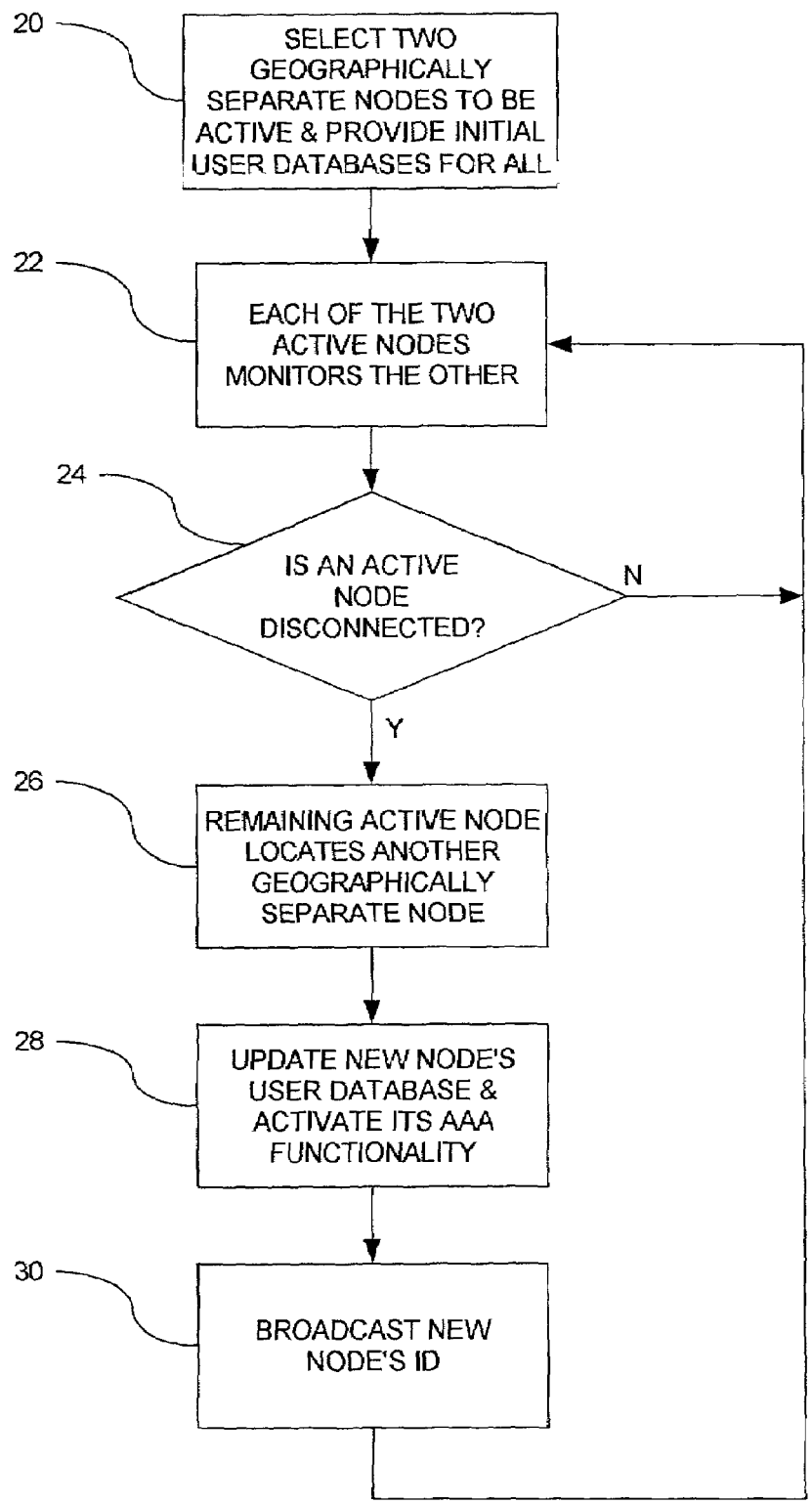
FIG. 2 is a flow chart showing a method of reliably retaining AAA function and/or maintaining its associated user database for the network shown in FIG. 1.

With reference to FIG. 2 and continuing reference to FIG. 1, the deployment of the network 10 begins with an initialization step 20. During initialization, two of the nodes are originally selected as the active nodes. While preferably all the nodes are AAA function capable, at any given time, only the active nodes act as AAA functional entities for the network 10. That is to say, only the active nodes have their AAA functions and/or servers activated or turned on, while the non-active nodes have their AAA functions and/or servers dormant or turned off. Herein, the terms "active" and "non-active" when used in the context of "active node" and "non-active node" refers to the state of the node's AAA functionality (i.e., its AAA server is active or non-active, respectively), and not to the general state of the node as a whole. That is to say, "non-active" nodes are in general still functional, it is just their AAA functions and/or servers that are non-active. Also during step 20, preferably, all of the nodes are initially provisioned with duplicate copies of the user database employed to carry out AAA functions.

Preferably, the two nodes selected as the active nodes are geographically separated from one another. Most preferably, the two nodes selected are the two having the greatest geographic separation. This protects against the two active nodes being simultaneously destroyed or otherwise disconnected from the network. Therefore, as shown in FIG. 1, the two nodes originally selected to be the active nodes would most preferably be 12a and 12e.

At step 22, the two active nodes carry out the AAA functions and monitor one another. Preferably, with respect to the AAA functions, a mobile station connecting or connected to the wireless network 10 contacts the local node (i.e., the node incorporating the cell site responsible for the geographic coverage of the area in which the mobile station is located) to conduct AAA verification, registration and/or other AAA processing. The local node then communicates with one of the two active nodes which completes the AAA verification, registration and/or other AAA processing for the mobile station. To maintain synchronization, any changes to the user database of one active node are logged, and the logged changes are communicated to the other active node so that its user database is similarly updated. The active nodes also monitor one another to ensure that they are both available and/or connected to the network 10.

At decision step 24, it is determined if one of the active nodes is disconnected from or otherwise not available to the network 10. That is to say, if one of the active nodes detects that the other is off-line, then the process continues on to step 26, otherwise if both detect that the other is still on-line, then the process loops back to step 22. Optionally, the active nodes may periodically check the connection status of each other, and/or the connection status may be determined each time the user databases of the active nodes are synchronized.

At step 26, if it has been determined that one of the active nodes has been disconnected from the network 10 or is otherwise off-line, the remaining active node locates and/or selects another node for activation. Again, preferably, the node newly selected for activation is geographically separate from the remaining active node, and preferably, the newly selected node is as geographically distant as possible from the remaining active node. For example, say after the original deployment in which nodes 12a and 12e are initially selected as the active nodes for the network 10, node 12e is destroyed by the enemy. When node 12a, which is monitoring node 12e, detects that node 12e is disconnected from the network 10 or otherwise off-line, node 12a locates and selects a new node for activation, preferably, node 12d which is now the farthest from node 12a.

Preferably, the newly selected node is also as geographically distant as possible from the active node which was just disconnect from or otherwise made unavailable to the network 10. In this case, the node newly selected for activation of its AAA functions and/or server is chosen to maximize the distance from both the remaining active node and the recently disconnected active node. It is particularly advantageous to locate the node newly selected for activation as far as possible from the recently disconnected node to remotely locate and protect the newly selected node from what ever brought about the disconnection or destruction of the recently downed node, be it an advancing enemy, approaching storm conditions, etc., which would otherwise soon overtake the position of the newly selected node if it were located in close proximity to the recently downed node. To accommodate both objectives (i.e., remote location from the remaining active node and remote location from the recently downed node), optionally, the new node is selected so that the sum of the distances to the remaining node and to the recently downed node is maximized.

At step 28, once the new node has been selected, its user database is updated. That is to say, all the logged changes from the remaining active node's user database are communicated to the new node so that its user database can be updated. In this manner, the new node's database is synchronized with the other which has been maintained current. Additionally, the new node's AAA functions are activated by the remaining active node. At step 30, the new node is identified to the network 10 as one of the AAA functional entities therefor. Preferably, the identification is made by the remaining active node broadcasting the new node's identity over the network 10 to inform all the other nodes that the newly selected node is now an active node for carrying out AAA functions. The newly selected node is now the second active node along with the previous remaining active node, and the process loops back to step 22.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A method of maintaining authentication, authorization and accounting (AAA) functionality for a wireless communications network having a plurality of nodes which are AAA function capable, said method comprising:
   (a) selecting two of the plurality of nodes to be active nodes;
   (b) activating the AAA functions of the active nodes;
   (c) monitoring the active nodes to determine if one of the active nodes gets disconnected from the network;

(d) if one of the active nodes gets disconnected from the network; selecting another of the plurality of nodes to become an active node;

(e) activating the AAA functions of the node selected in step (d); and, (f) informing the plurality of nodes that the node selected in step (d) has its AAA functions activated.

2. The method of claim 1, wherein the two active nodes selected in step (a) are chosen so that a geographic distance therebetween is maximized.

3. The method of claim 1, wherein each active node carries out the monitoring of the other.

4. The method of claim 1, wherein each of the plurality of nodes has integrated therein a mobile switching center, a visitor location register, a home location register, a AAA server, and a cell site.

5. The method of claim 1, wherein the node selected in step (d) is chosen so that a geographic distance between active nodes is maximized.

6. The method of claim 1, wherein the node selected in step (d) is chosen so that a geographic distance between it and the active node which got disconnected from the network is maximized.

7. The method of claim 1, wherein the node selected in step (d) is chosen to maximize a sum of a geographic distance to between the active nodes and a geographic distance between the node selected in step (d) and the node which got disconnected from the network.

8. The method of claim 1, further comprising:

provisioning each of the plurality of nodes with a duplicate copy of a user database, each of said user databases being employed by its respective node to carry out AAA functions.

9. The method of claim 8, further comprising:

logging changes to the user databases for the active nodes thereby updating the same to reflect changes in information contained therein.

10. The method of claim 8, further comprising:

synchronizing the user databases of the active nodes.

11. A wireless communication network comprising:

a plurality of nodes, each node being initially provisioned with a user database and equipped to carry out authentication, authorization and accounting (AAA) functions for the network by employing their respective user database, said plurality of nodes including:

a subset thereof which are active nodes that in fact carry out the AAA functions for the network by employing their respective user databases, said active nodes monitoring one another to detect if an active node becomes disconnected from the network, wherein when one is determined to be disconnected from the network another of the plurality of nodes is selected to be an active node and the network informed thereof.

12. The wireless communication network of claim 11, wherein each of the plurality of nodes has integrated therein a mobile switching center, a visitor location register, a home location register, a AAA server, and a cell site.

13. The wireless communication network of claim 11, wherein each of the active nodes logs changes to its user database thereby updating the same to reflect changes in information contained therein.

14. The wireless communication network of claim 13, wherein each of the active nodes communicates its logged changes to the other active nodes so that their user databases are similarly updated.

15. The wireless communication network of claim 14, wherein when a new node is selected to be an active node all logged changes prior to its selection are communicated thereto so that its user database is brought current.

16. The wireless communication network of claim 11, wherein the subset includes no more than two of the plurality of nodes.

17. The wireless communication network of claim 16, wherein each of the plurality of nodes communicates directly with the others.

18. A method of operating a wireless communication network including a plurality of nodes, each of said nodes having a user database and being equipped to conduct authentication, authorization and accounting (AAA) functions for the network, said method comprising:

(a) employing a subset of the plurality of nodes as active nodes, said active nodes using their respective user databases to conduct the AAA functions for the network;

(b) logging changes to the user databases for the active nodes thereby updating the same to reflect changes in information contained therein;

(c) synchronizing the user databases of the active nodes;

(d) monitoring the active nodes to detect if one becomes disconnected from the network; and, (e) if one of the active nodes becomes disconnected from the network, employing another of the plurality of nodes as an active node.

19. The method of claim 18, further comprising:

(f) synchronizing the user database of the node employed in step (e) with the user database of a node which is already an active node.

20. The method of claim 19, further comprising:

(g) identifying to the network the node employed in step (e).

* * * * *